US008589362B1

(12) United States Patent
Braam et al.

(10) Patent No.: US 8,589,362 B1
(45) Date of Patent: Nov. 19, 2013

(54) CLUSTER METADATA RECOVERY

(75) Inventors: Peter Jacobus Braam, Canmore (CA);
Andreas Dilgor, Calgary (CA); Alexey Zhyravlev, Moscow (RU)

(73) Assignee: Oracle America, Inc., Redwood City, CA (US)

( * ) Notice: Subject to any disclaimer, the term of this patent is extended or adjusted under 35 U.S.C. 154(b) by 1957 days.

(21) Appl. No.: 11/483,079

(22) Filed: Jul. 6, 2006

(51) Int. Cl.
*G06F 17/30* (2006.01)
(52) U.S. Cl.
USPC .......................... 707/695; 709/224; 370/380
(58) Field of Classification Search
USPC ................................................ 707/200, 695
See application file for complete search history.

(56) References Cited

U.S. PATENT DOCUMENTS

| 2005/0165862 | A1* | 7/2005 | Loafman et al. | 707/202 |
| 2006/0101033 | A1* | 5/2006 | Hu et al. | 707/100 |
| 2006/0129614 | A1* | 6/2006 | Kim et al. | 707/202 |
| 2006/0253502 | A1* | 11/2006 | Raman et al. | 707/202 |
| 2008/0059495 | A1* | 3/2008 | Kiessig et al. | 707/100 |

OTHER PUBLICATIONS

Cluster File Systems, Inc., "Lustre: A Scalable, High-Performance File System," Lustre Whitepaper Version 1.0, 12 pages (Nov. 11, 2002).
"Lustre Features Roadmap, Version 1.8," 3 pages (Jun. 1, 2005).
Cluster File Systems, Inc., "Lustre: Frequently Asked Questions," http://www.clusterfs.com/faq.html, 25 pages (Sep. 26, 2005).
Cluster File Systems, Inc., "Lustre: Scalable Storage," http://www.clusterfs.com/, 2 pages (May 20, 2005).
Cluster File Systems, Inc., "Lustre: High-Performance Storage Architecture and Scalable Cluster File System," 2 pages (Nov. 2003-2004).

* cited by examiner

*Primary Examiner* — Apu Mofiz
*Assistant Examiner* — Mohammad Rahman
(74) *Attorney, Agent, or Firm* — Martine Penilla Group, LLP

(57) ABSTRACT

A method and apparatus are described for recovering a fully consistent file system stored in a cluster file system with multiple metadata servers using an epoch of undo records. The epoch consists of (i) a virtual instantaneous snapshot marking a consistent and valid file system image and (ii) a set of undo records that enable the file servers to roll-back to this fully consistent image associated with the file system. The file system is recovered by rolling back file transactions associated with undo records subsequent to the undo records associated with the epoch snapshot. In addition, the undo records are maintained by advancing the epoch value and purging unneeded undo records.

24 Claims, 12 Drawing Sheets

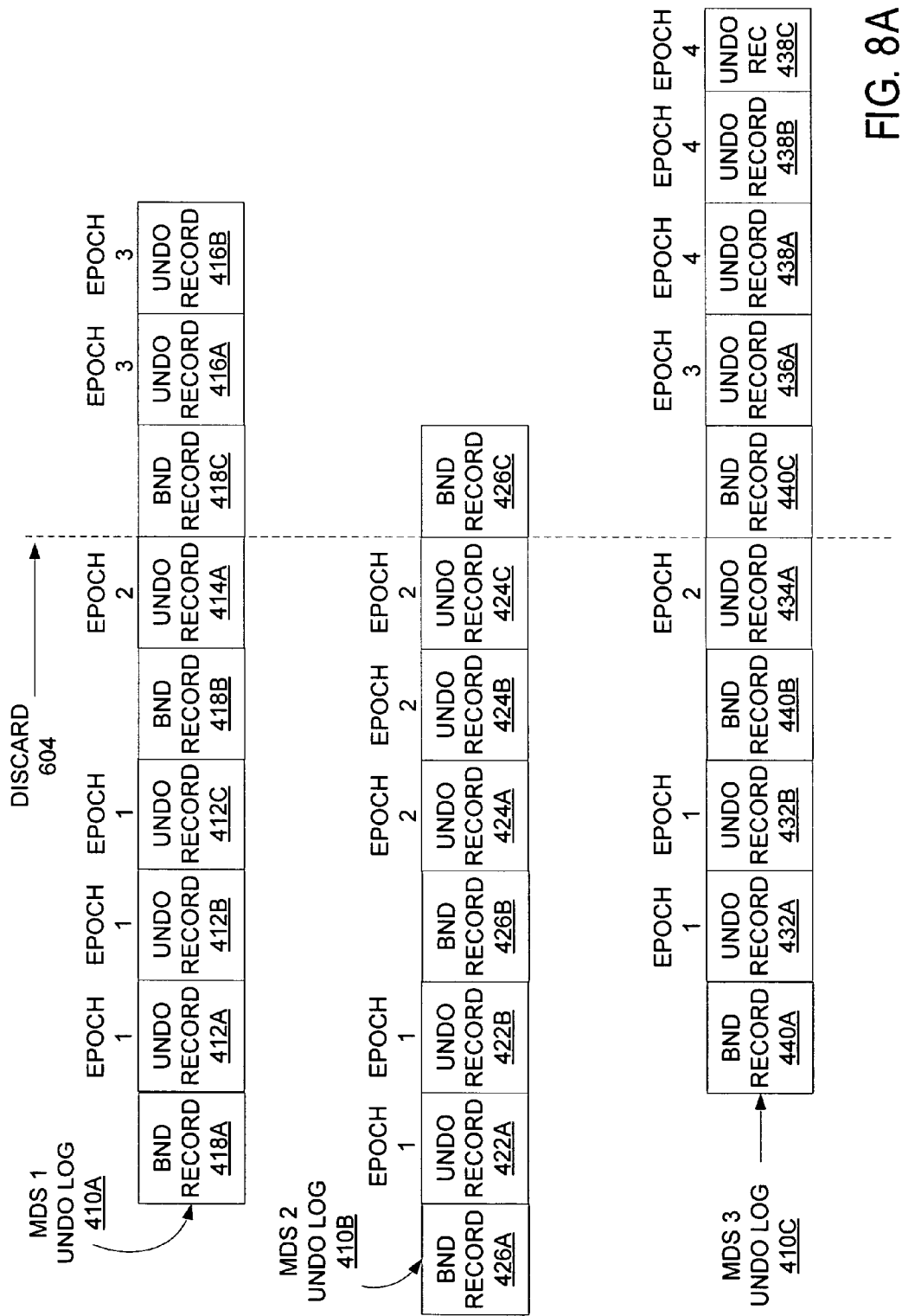

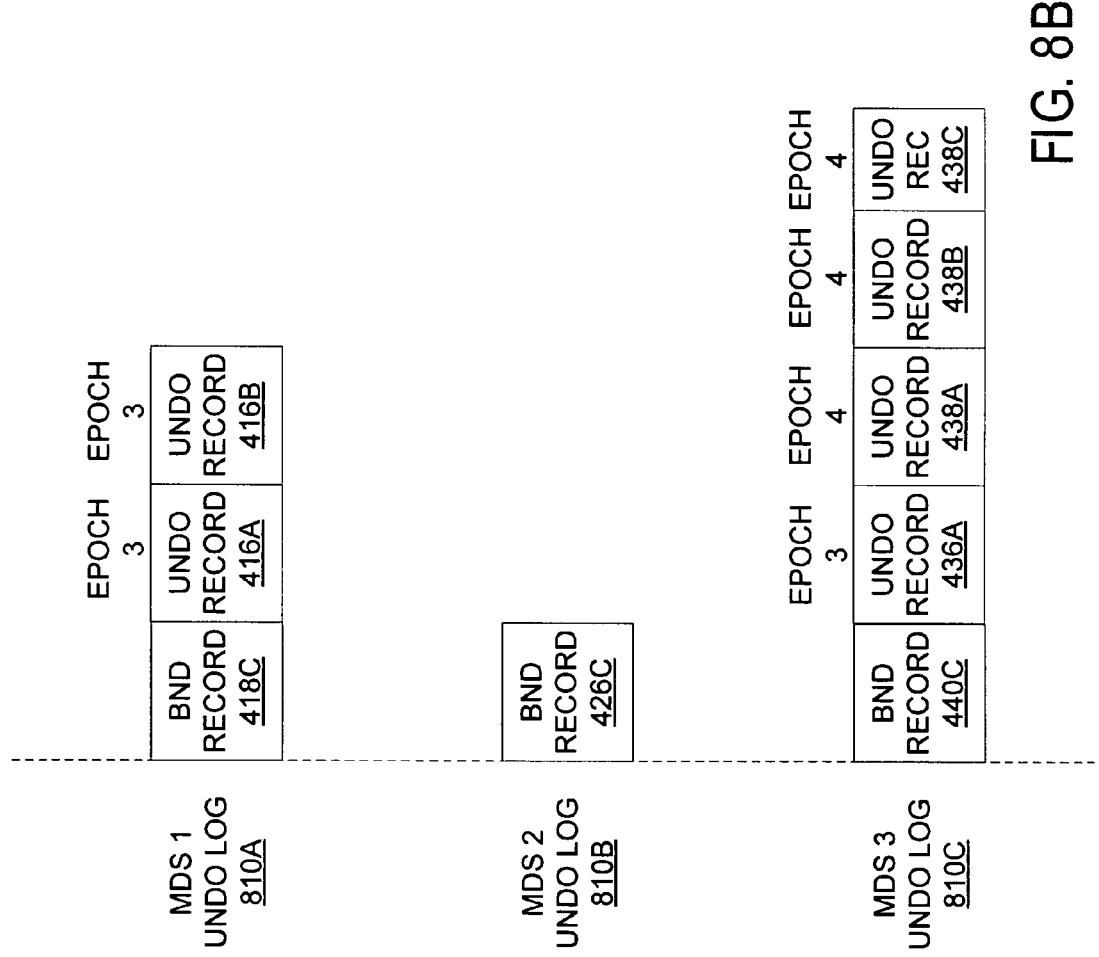

CLUSTER METADATA RECOVERY

FIELD

An embodiment of the invention relates generally to file systems, and more particularly to recovering file system metadata stored on file server clusters.

BACKGROUND

Network-oriented computing environments utilize high-performance, network-aware file systems for individual system data storage and data sharing for workgroups and clusters of cooperative systems. One type of high-performance file systems is a distributed file system. Traditional distributed file systems decouple computational and storage resources, where the clients focus on user and application requests and file servers focus on reading, writing, and delivering data.

Another type of distributed file system is one that separates the storage resources responsibility into a metadata server and a cluster of fileservers. The metadata servers maintain a transactional record of high-level file and file system transactions. For example and by way of illustration, file and file system transactions typically are: file creation, file deletion, file modification, directory creation, directory deletion, directory modification, etc. On the other hand, the fileserver is typically responsible for actual file system input/output (I/O), maintaining file allocation data and file size during 10, etc. Separating the transactional recording and file manipulation is a more efficient division of labor between computing and storage resources.

FIG. 1 illustrates one example of a prior art cluster file system 100 comprising a metadata server and multiple distributed object storage targets as file servers. In FIG. 1, the cluster file system comprises multiple clients 102A-N coupled to multiple distributed object store servers (OSS) 104A-M and a metadata server (MDS) 108 over data network 110. The MDS is attached to a metadata target (MDT) 110 which provides storage for the metadata in the file system. In addition, each OSS 104A-M is coupled to one or more object storage targets (OST) 106A-M. Typically, clients 102A-N are computers that utilize the fileserver cluster. Typically, clients are personal computers, laptops, handheld devices, computer servers, web servers, application servers, etc. and/or combination thereof. As per above, MDS 108 maintains a record of high-level file transactions. These transactions are used to preserve file system consistency in case of an interrupt to the MDS software stack, which, for example can be caused by power loss. Each OSS 104A-M manages the file data and file allocation metadata stored in the corresponding OST storage array 106A-M. While for one example OSS storage array 108A-M is a LINUX based server using disk arrays as its OST, for other examples, OST storage array 106A-M can be an integrated device, such as an intelligent storage controller or intelligent disk. Furthermore, while for one example, the data network is a transmission control protocol (TCP) based gigabit Ethernet network, other examples may be different data network types (e.g., Quadrics (QSWNet), Myrinet, Infiniband, wireless, etc. and/or combinations thereof). In addition, cluster file system 100 may include a redundant MDS (not shown) that takes over in the event of MDS 108 going down.

Although cluster file system 100 is an advancement with respect to a traditional client/file server system, having one MDS 108 represents a single point of failure and a computational bottleneck. Even though cluster file system 100 may have a redundant MDS in case MDS 108 fails, redundant metadata servers do not by themselves relieve the computational bottleneck.

SUMMARY

A method and an apparatus are described for recovering a fully consistent file system stored in a cluster file system with multiple metadata servers using an epoch of undo records. The epoch comprises (i) a virtual instantaneous snapshot marking a consistent and valid file system image and (ii) a set of undo records that enable the file servers to roll-back to this fully consistent image associated with the file system. The file system is recovered by rolling back file transactions associated with undo records subsequent to the undo records associated with the epoch snapshot. In addition, the undo records are maintained by advancing the epoch value and purging unneeded undo records.

Embodiments of the present invention are described in conjunction with systems, clients, servers, methods, and machine-readable media of varying scope.

Other features and advantages of embodiments of the invention will be apparent from the accompany drawings and from the detailed description that follows.

BRIEF DESCRIPTION OF THE DRAWINGS

The present invention is illustrated by way of example and not limitation in the figures of the accompanying drawings, in which the references indicate similar elements and in which:

FIG. 8A shows one example of undo logs for a metadata server cluster when used to purge unneeded undo records.

FIG. 8B shows one example of undo logs for a metadata server cluster used after purging unneeded undo records.

DETAILED DESCRIPTION

A recovery mechanism for a cluster of metadata servers is described. As will be described in more detail below, for one embodiment a cluster file system employs a cluster of metadata servers. Each metadata server includes an undo log that comprises a plurality of undo records. The undo records are written as part of the transactions that update metadata on one of the metadata servers in the file system. The undo records contain sufficient information to undo the effect of the transaction they belong to. Furthermore, each undo record is associated with an epoch value. An epoch is a marker indicating a fully consistent file system image. An intended advantage is defining the epoch that can be used to recover a fully consistent file system in the event of cluster file system outage. Another intended advantage is to define multiple epochs allowing different levels of recovery.

An embodiment is described wherein the cluster of metadata servers rollback to a previous epoch. An intended advantage of the embodiment is for the cluster of metadata servers to rollback to a fully consistent state. Another intended advantage is to support metadata dependencies across multiple metadata servers. A further intended advantage is that this mechanism does not invoke a coordinated wait condition among nodes that disrupts the flow of operations.

A method is described for updating an epoch across a cluster of metadata servers. An intended advantage of this method is to advance the epoch value associated with future undo records. A further intended advantage is to identify unneeded undo records and purge these records accordingly. Another intended advantage is to determine if certain file transactions do not need associated undo records.

Figure 1:
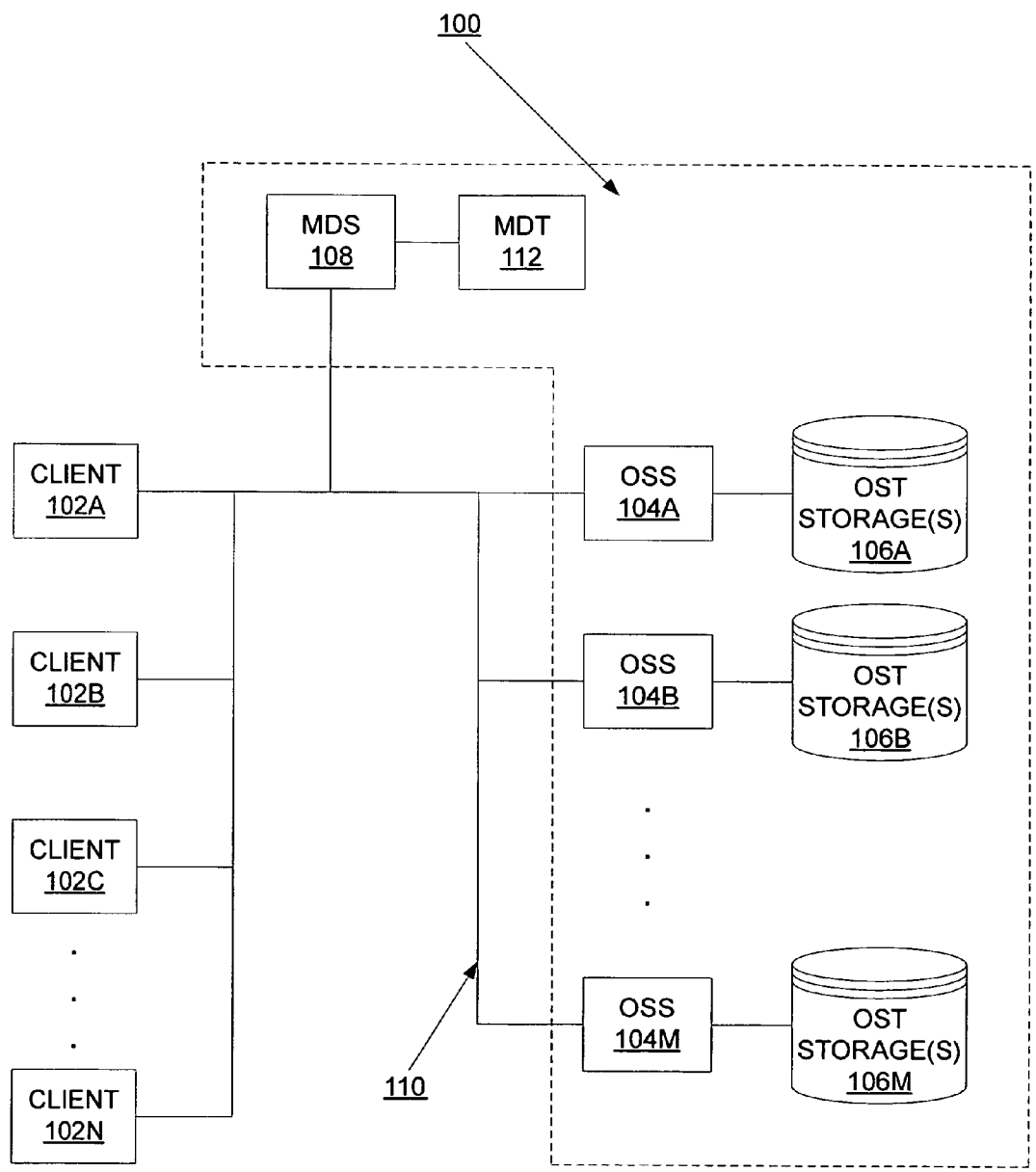
FIG. 1 shows one example of a prior art cluster file system comprising a metadata server and multiple distributed object storage targets.
Figure 2:
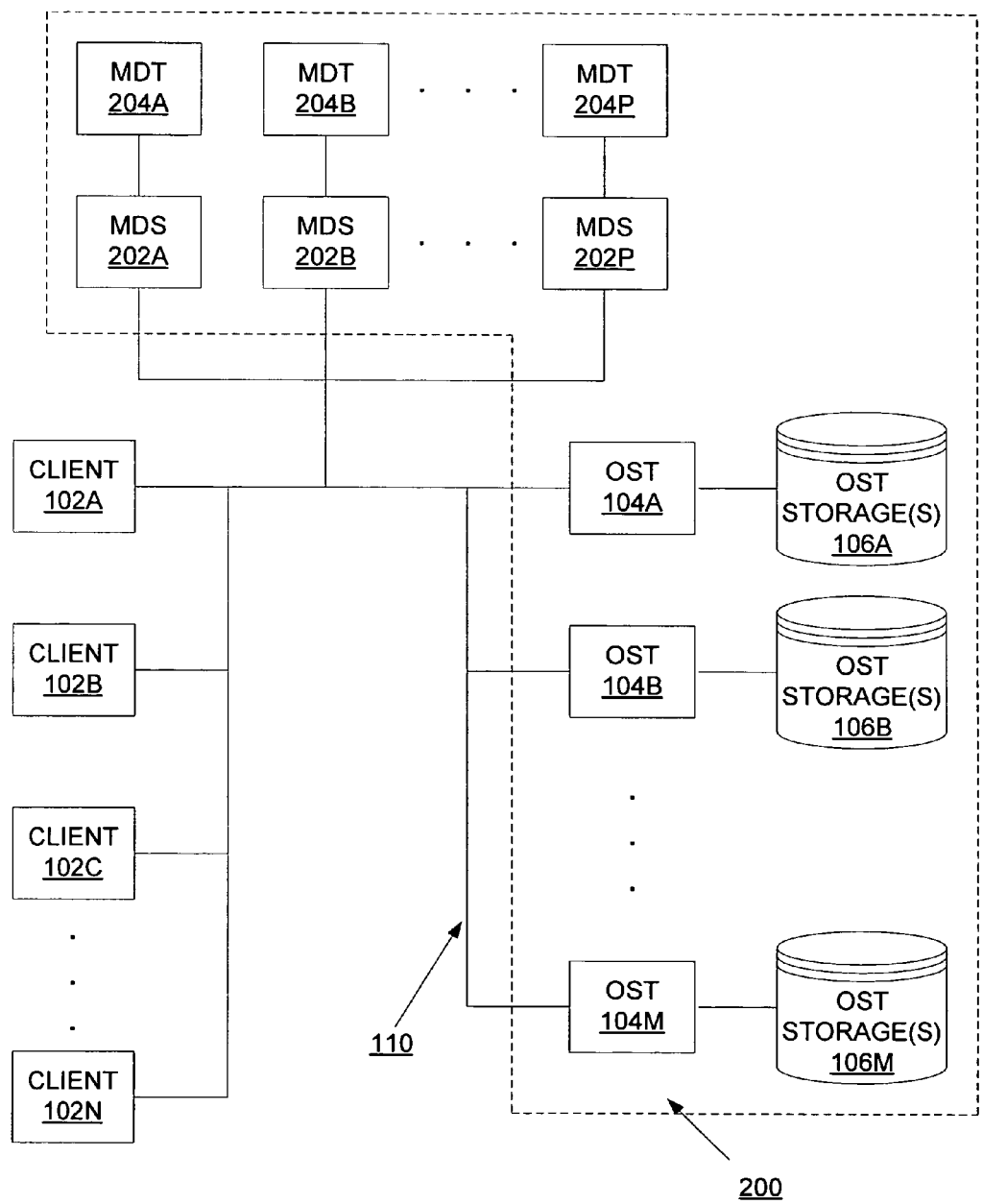
FIG. 2 shows one example of a cluster file system comprising multiple metadata servers and multiple distributed object storage targets.

FIG. 2 illustrates one example of a cluster file system 200 comprising multiple metadata servers and multiple distributed object storage targets. As in FIG. 1, FIG. 2 comprises clients 102A-N coupled to cluster file system 200 via data network 110. Clients 102A-N and cluster file system 200 communicate through network 110 using a variety of protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Clients 102A-N can be a personal computer system, a network computer, a Web TV system, a handheld device, or other such computer system. Clients 102A-N are coupled to the network through network interfaces, that can be Ethernet interfaces, wireless interfaces or network interfaces known in the art. In addition, cluster file system 200 comprises OSS 104A-M coupled to OST storage(s) 106A-M. However, unlike FIG. 1, in FIG. 2, the metadata storage for cluster file system 200 comprises a cluster of MDS 202A-P coupled to OST 104A-M and client 102A-N via data network 110 MDS 202A-P further couples to MDT 204A-P. While for one example each MDS 202A-P couples to one MDT 204A-P, for other examples (not shown), each MDS 202A-P one or more MDT 204A-P, two or more MDS 202A-P share an MDT 204A-P, and/or combinations thereof.

Typically, clients 102A-N contact a MDS 202A-P to initiate the execution of a file system operation. As above, a file system operation may be reading, writing, creating, deleting, renaming, or otherwise modifying, etc. a file and/or directory. The contacted MDS 202A-P initiates the operation requested by clients 102A-N. The initiating MDS 202A-P may involve one or more other MDS 202A-P in the process. The other MDS 202A-P server executes a dependent operation. For example and by way illustration a new directory can be created by inserting the name of the new directory into the parent directory on one MDS 202A-P while the inode for the new directory is created on another MDT 204A-P. Operations can even involve more than two MDS servers, for example directory rename and directory split, an operation where a very large directory is split into components residing on different targets for the purpose of load balancing operations can involve more than two MDS 202A-P and/or repeated transactions. In this case, a stack of initiating and dependent calls is built, with each MDS 202A-P involved starting one dependent operation on another MDS 202A-P. For example and by way of illustration, consider creating a new file within an existing directory. Furthermore, assume that the metadata for the file will be stored in MDS 202A and the directory metadata is stored in MDS 202B. In this example, a client contacts MDS 202A to create the file. In response, MDS 202A contacts MDS 202B to initiate the directory modification because a new file will stored in the directory. MDS 202B initiates the directory modification and creates an associated undo record. After completing the directory modification, MDS 202A initiates the transaction creating the new file and creates an undo record for the file creation.

Furthermore, MDS 202A-P executes file system transactions in volatile storage using a start/stop pattern. The MDS 202A-P collects the file system transactions into disk transactions. The disk transactions are sequentially ordered. For example and by way of illustration, if file system transaction A is started before file system transaction B, file system transaction A will be associated with a disk transaction that is the same or occurs earlier to the disk transaction associated with file system transaction B. A file system transaction comprises (a) an update to the file system metadata (b) a transaction number and (c) a corresponding undo record. The undo records are maintained in an undo log: Undo logs are further described in FIG. 3. MDS 202A-P commits to disk the file system transactions comprising metadata, transaction numbers and undo records in an atomic fashion consistent with the ordering based on the memory transaction number order.

Nevertheless, if a system with multiple MDS crashes due to a power failure or due to multiple MDS failures, the metadata stored on the MDS cluster may not represent a valid file system. This is because some of the metadata may be committed to disk while some of the metadata may be lost in a MDS crash. As will be described further in FIG. 5, loss of metadata does not present the file system inconsistency problem when there is only one MDS. With two or more MDS, loss of metadata can cause file system inconsistencies because of the metadata dependencies. For example and by way of illustration, consider the scenario where a client creates a directory and stores a number of files. Further, assume that the metadata for the directory creation is stored on MDS 202A, while the metadata for the creation for the files is stored on MDS 202B. If the directory creation metadata was lost, then the files stored in the directory would be lost from the file system because the directory no longer exists in the file and the files have no place to be stored in the file system. Thus, there is a need to keep the file system in a defined state across a cluster MDS that can withstand loss of metadata.

MDS 202A-P further comprise cluster management module that includes MDS rollback module. MDS rollback module manages the rollback information contained in the undo logs. MDS rollback module adds the undo records to undo logs, rolls back MDS 302A-P in the event of a cluster file system 200 crash, purges unneeded undo records, etc. Furthermore, because the dependencies between the undo logs, MDS rollback management module communicate with each other to manage the undo logs such that MDS rolls back the cluster file system 200 to a fully consistent file system. This includes rolling back the file system to a state where the file system dependencies are properly satisfied. Cluster management module functionality is further described in FIGS. 5-9.

In addition, each MDS 202A-P is labeled with an index, an integer assigned to each MDS that is present in the cluster. MDS 202A-P use the index to determine a coordinating MDS for different operations, such as file system recovery, updating epochs, etc. While for one example the index is an integer increment starting at one, other examples may have different indexing schemes (assigning index based on computing resources, etc.).

For one example two processes are running that manage and make use of the metadata, undo logs and the associated data stored on MDS 202A-P and MDT 204A-P. One process informs MDS 202A-P to start a new epoch. In addition, the last globally committed epoch is communicated to MDS 202A-P so that each MDS 202A-P can cancel records in the undo log that will not be needed. This process is further described in FIG. 7 below. For one example this process runs during normal operation and initiated in a round robin fashion among MDS 202A-P.

The second process is a process that rolls back the file system after an unclean shutdown. The recovery process runs at startup of the file system. This roll back process rolls back the file system across MDS 202A-P and MDT 204A-P to the last globally committed epoch. For one example the roll back process additionally collects the last globally committed epoch and cancels unused undo records. For a further example, the file system cannot be used during until the rollback process completes. The roll back process is further described in FIG. 5 below.

Figure 3:
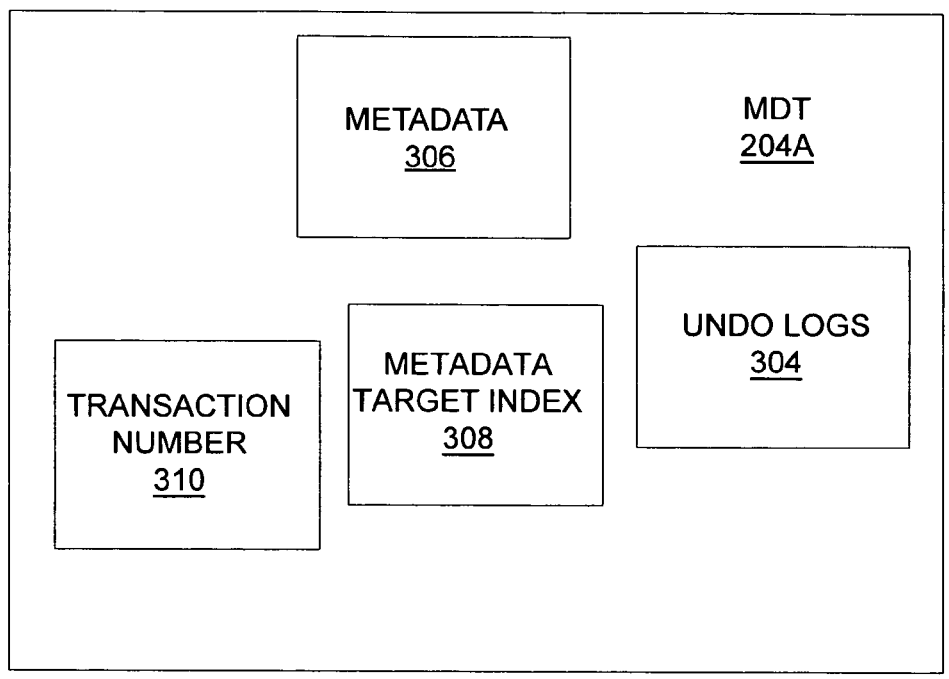
FIG. 3 is a block diagram illustrating one example of a cluster of metadata storage targets indicating disk layout of key data.

FIG. 3 is a block diagram illustrating one example of the data layout of a MDT 204A. Other MDT 204B-P contain similar data. In FIG. 3, MDT 204A comprise undo logs 304A, metadata 306, metadata target index 308, and transaction number 310. Undo logs 304 comprise one or more undo records that describe each transaction initiated by MDS 302A-P. MDS 302A-P use the undo logs to roll back the transactions described in undo logs 304, based on an ordering constraint in the implementation which assures that the undo records are written before or atomically with the associated metadata updates. Because there are multiple MDS 202A-P, there can be dependencies among the undo records in the undo logs stored on MDT 204A-P. Furthermore, because a file system typically commits file transaction information, such as undo records, to disk in batches, not all of the undo records in undo logs 304A-P may be committed to disk. Thus, loss of power or multiple MDS crash could result in the loss of undo records and associated metadata not committed to disk. Undo logs are further described in FIG. 4, below.

Metadata 306 comprises information about the files and directories that make up a file system. While for one example this information can simply be information about local files, directories, and associated status information, for other examples, the information can also be information about mount points for other file systems within the current file system, information about symbolic links, etc. and/or combinations thereof. Each MDT 204A-P further comprises index 308, where index 308 is used by MDS 202A-P to determine which MDT 204A-P is associated with MDS 202A-P for a particular operation. Transaction number 310 is a series of one or more integers relating a particular under record that is part of undo log 306 with a corresponding transaction.

Figure 4:
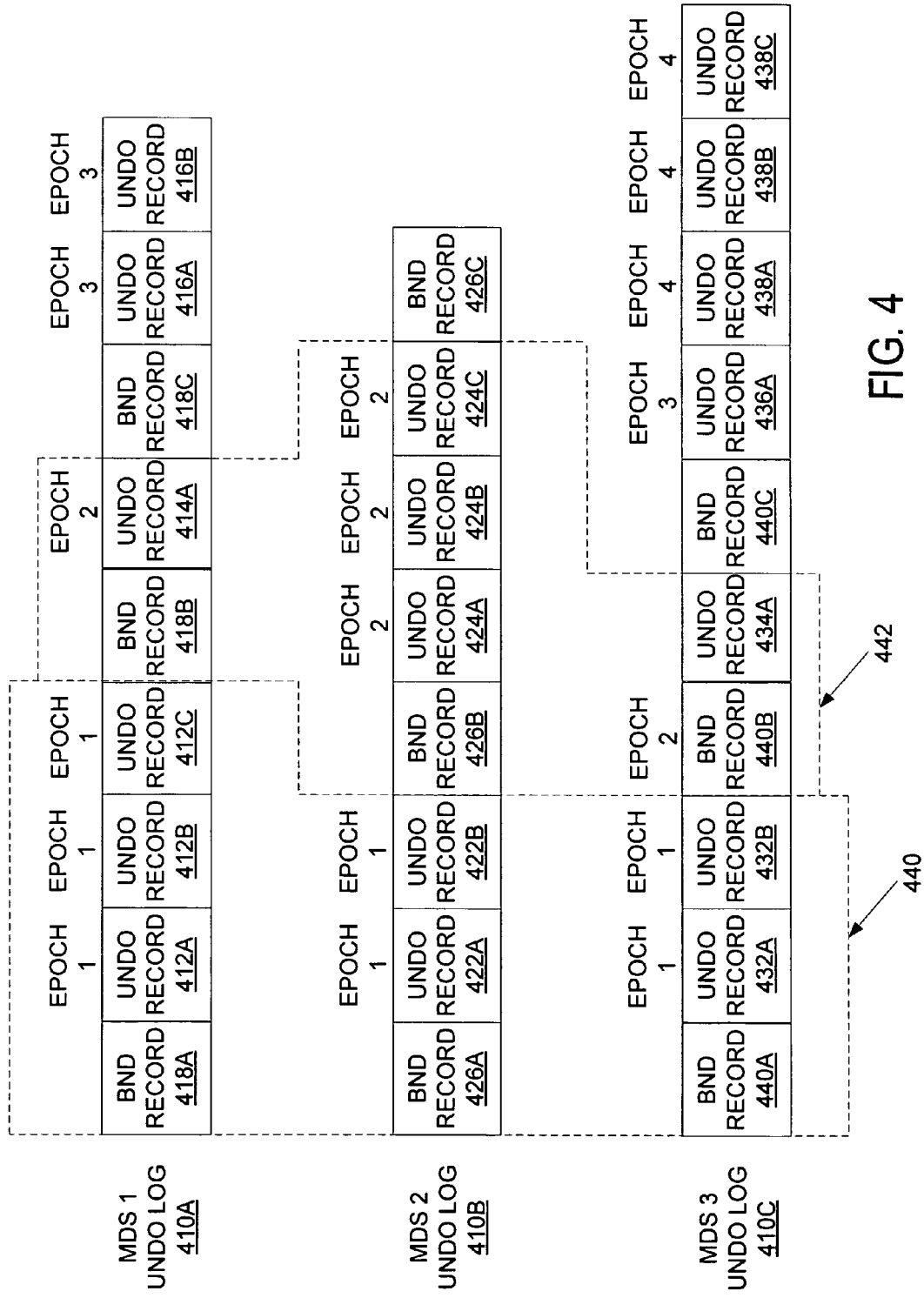
FIG. 4 shows one example of undo logs for a metadata server cluster.

FIG. 4 illustrates one example of undo logs for a metadata server cluster. In FIG. 4, MDS undo logs 410A-C each comprises a plurality of epoch boundary and undo records. A boundary record is a record that marks the beginning of an epoch. For an alternate embodiment, the boundary record is a flag in the first record of an epoch. As stated above, an undo record contains sufficient information to undo the effect of the transaction to which it belongs. For example and by way of illustration, MDS undo log 410A comprises epoch boundary records 418A-C and undo records 412A-C, 414A, and 416A-B. In addition, MDS undo log 410B comprises epoch boundary records 426A-C and undo records 422A-B and 424A-C. In addition, MDS undo log 410C comprises epoch boundary records 440A-C and undo records 432A-B, 434A, 436A, and 438A-C. Alternatively, MDS undo logs 410A-C may comprise one or no undo records.

Furthermore, each boundary and undo record is associated with an epoch number. An epoch is a collection of operation that includes all the file transaction dependencies. At the end of an epoch, MDS 202A-P are in a completely dependent state, because the file transactions that depend on each other are include in the epoch. For example and by way of illustration, boundary records 418A, 426A, and 440A and undo records 412A-C, 422A-B, and 432A-B are associated with epoch one. Furthermore, boundary records 418B, 426B, and 440B and undo records 414A, 424A-C, and 434A have epoch value of two. In addition, boundary records 416C, 426C, and 440C and undo records 416A-B and 436A have epoch three while undo records 438A-C have epoch four. Other examples may have undo records with epoch numbers with different values.

By associating each undo record with an epoch number, an epoch is defined across multiple MDS 302A-P. As mentioned above, each epoch is defined in such a way that the file system resulting from a rollback is consistent file system. By way of illustration, epoch 440 comprises boundary records 418A, 426A, and 440A and undo records 412A-C, 422A-B, 432A-B with an epoch value of one. In addition, epoch 442 comprises boundary records 418B, 426B, and 440B and undo records 414A, 424A-C, 434A with an epoch value of two. On the other hand, boundary records 418C, 426C, and 440C and undo records 416A-B, 436A, and 438A-C do not belong to an epoch because these undo records do not define a fully consistent file system.

Figure 5:
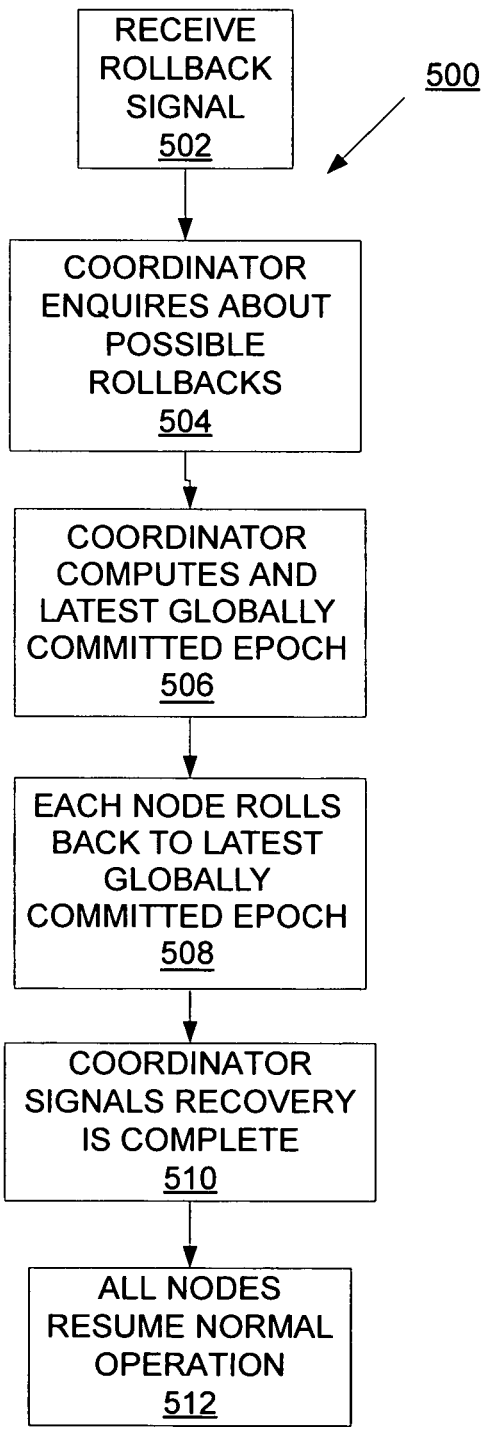
FIG. 5 is a flow diagram of one example of a method that rolls back a cluster to the last epoch.

FIG. 5 is a flow diagram of one example of a method 500 that rolls back a cluster to the last epoch. In FIG. 5, at block 502, method 500 receives a rollback signal that indicates cluster file system 200 has undergone a crash, lost power, etc., to one, some or all of the nodes comprising the cluster file system 200. While for one example method 500 receives a rollback signal by sensing a disruption of a keep alive signal between MDS 202A-P, for other examples, method 500 receives a rollback signal through any of a wide variety of cluster membership and liveness mechanisms.

At block 504, method 500 assigns a coordinator that coordinates the rollback amongst MDS 202A-P. While for one example method 500 assigns the coordinator to the MDS 202A-P with index one, for other examples, method 500 may assign the coordinator with a different index or some other coordinator election algorithm known in the art. The coordinating MDS enquires about possible rollbacks from other MDS. For purposes of illustration, let MDS 202A have index one and be the coordinator for rollback management. When the coordinator announces itself each MDS 202A-P initiates recovery scans its undo logs and responds to the MDS coordinator 202A indicating the last committed epoch. For one example the coordinator announces itself by sending a SNAPSTATUS_LOCAL message to the other MDS 202A-P.

At block 506, method 500 computes and distributes rollback corresponding to the latest globally committed epoch to MDS 202A-P. For one example coordinating MDS 202A sends a snapstatus message with flags STATUS GLOBAL|STATUS_ROLLBACK and the epoch value. MDS 202A-P receive the message and roll back the undo records to the common epoch.

At block 508, method 500 rolls back the target data to the latest globally committed epoch boundary and responds to coordinator. For one example MDS 202A-P roll back to the earliest committed using the undo records. An undo record contains sufficient information to undo all changes made to the metadata in a transaction. Each record has a method associated with the type of transaction undo information it encodes to process the undo operation. For one example MDS 202A-P return status to MDS coordinator MDS 202A using message snapstatus with flags. An example of a rollback is illustrated in FIGS. 6A-B below.

Figure 6A:
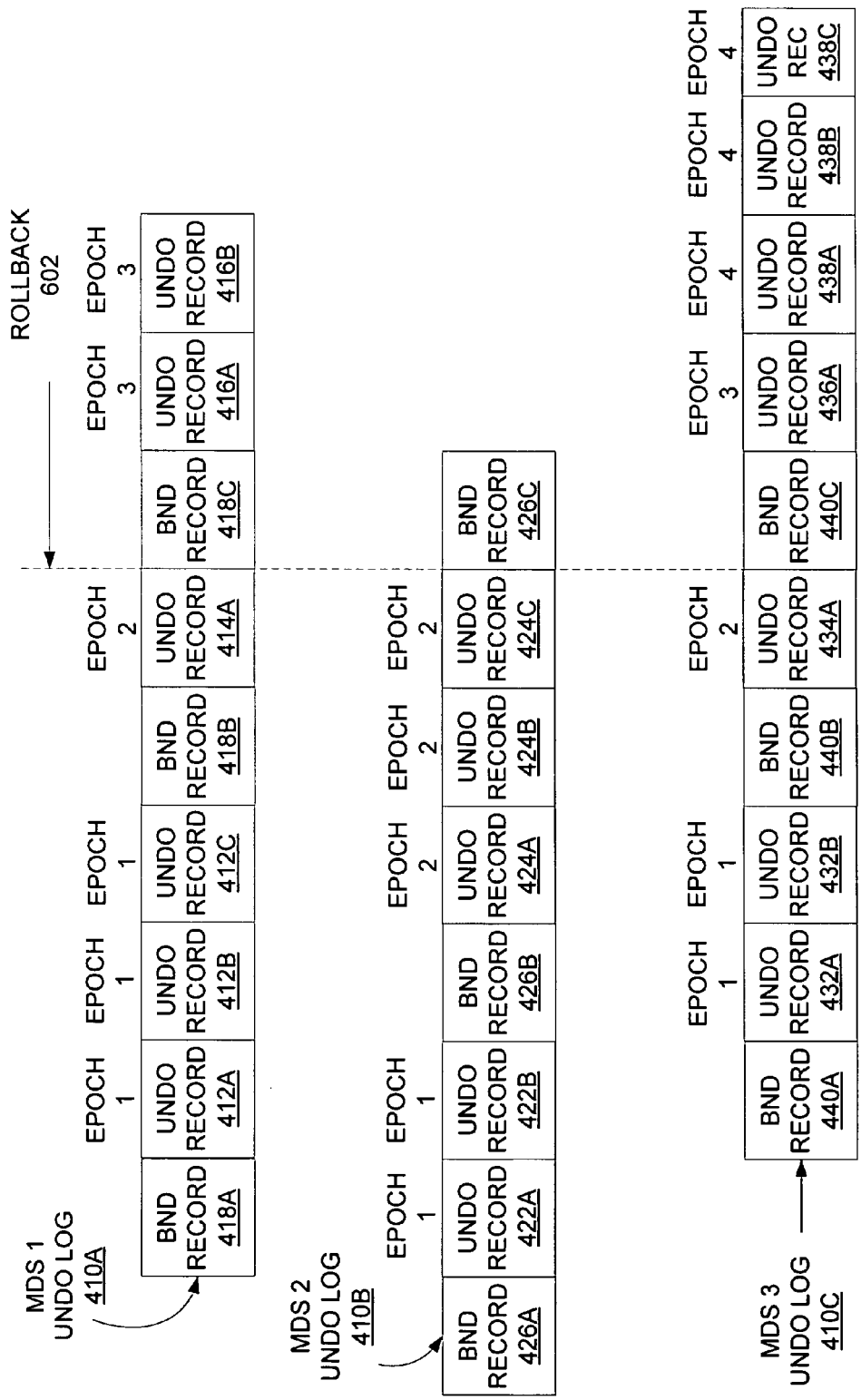
FIG. 6A shows one example of undo logs for a metadata server cluster used for a cluster recovery.

FIG. 6A illustrates one example of undo logs 410A-C for a metadata server cluster used for a cluster recovery. As in FIG. 4, in FIG. 6A, MDS undo logs 410A-C comprises boundary and undo records as follows: MDS undo log 410A comprises boundary records 418A-C, undo records 412A-C with epoch value one, undo record 414A with epoch value two, and undo records 416A-B with epoch value three; MDS undo log 410B comprises boundary records 426A-C, undo records 422A-B with epoch value one and undo records 424A-C with epoch value two; while MDS undo 410C comprises boundary records 440A-C, undo records 432A-B with epoch value one, undo record 434A with epoch value two, undo record 436A with epoch value three, and undo records 438A-C with epoch value four. For this example and by way of illustration, epochs 440-442 are committed to the disk and available to cluster file system 200 for rollbacks. Because epoch two is later in time than epoch one, method 500 will choose epoch two for a cluster rollback endpoint. By using epoch two for the rollback, method 500 undoes the transactions in undo records 416-B, 436A, and 438A-C.

Figure 6B:
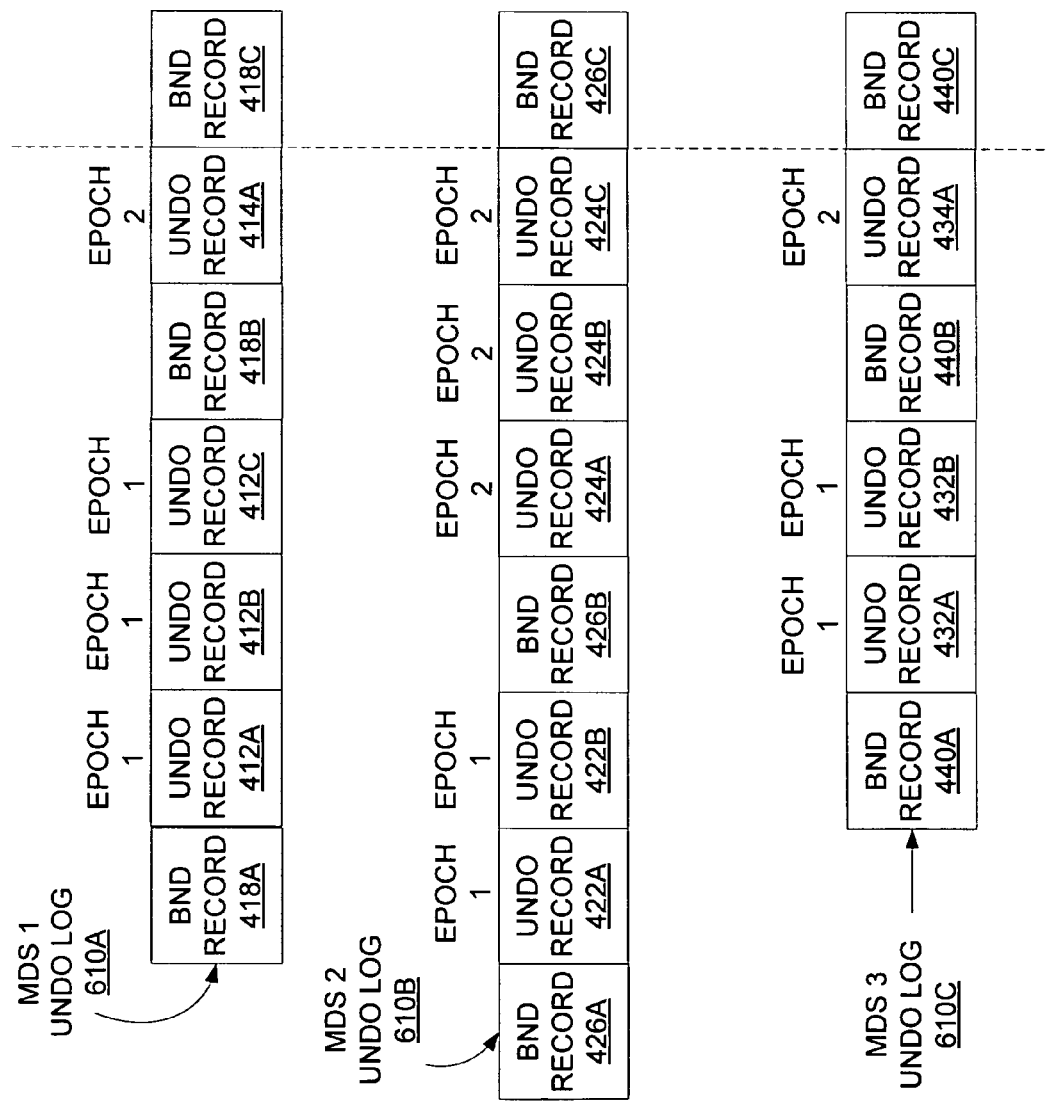
FIG. 6B shows one example of undo logs for a metadata server cluster used after cluster recovery.

FIG. 6B illustrates one example of undo logs 610A-C for a metadata server cluster used after cluster recovery. In FIG. 6B, undo records with epoch value one or two remain after cluster recovery. For one example after cluster recovery, the undo records comprising the last consistent file system are kept whereas the other undo records are discarded. Furthermore, the boundary record associated with the next available epoch is kept or regenerated. For example, and by way of illustration, in FIG. 6B, the resulting MDS undo log 610A comprises boundary records 418A-C and undo records 412A-412C and 414A; MDS undo log 610B comprises boundary records 426A-C and undo records 422A-B and 424A-C; and MDS undo log 610C comprises boundary records 440A-C and undo records 432A-B and 434A.

Returning to FIG. 5, at block 512, method 500 determines if the rollback is complete. While for one example method 500 determines if the rollback is complete by the number of non-finished snapstatus messages received, for other examples method 500 may determine rollback status using equivalent process notification schemes known in the art.

If method 500 determines the rollback in complete, method 500 sends a rollback complete message to MDS 202A-P. For one example MDS 202A sends snapstatus message with flags STATUS_GLOBAL|STATUS_ROLLB_COMPL. If the rollback is not complete and status response have not been received method 500 initiates a recovery of the cluster as described at block 502 above. However, if the roll back is complete, MDS 202A-P resume normal operation.

Figure 7:
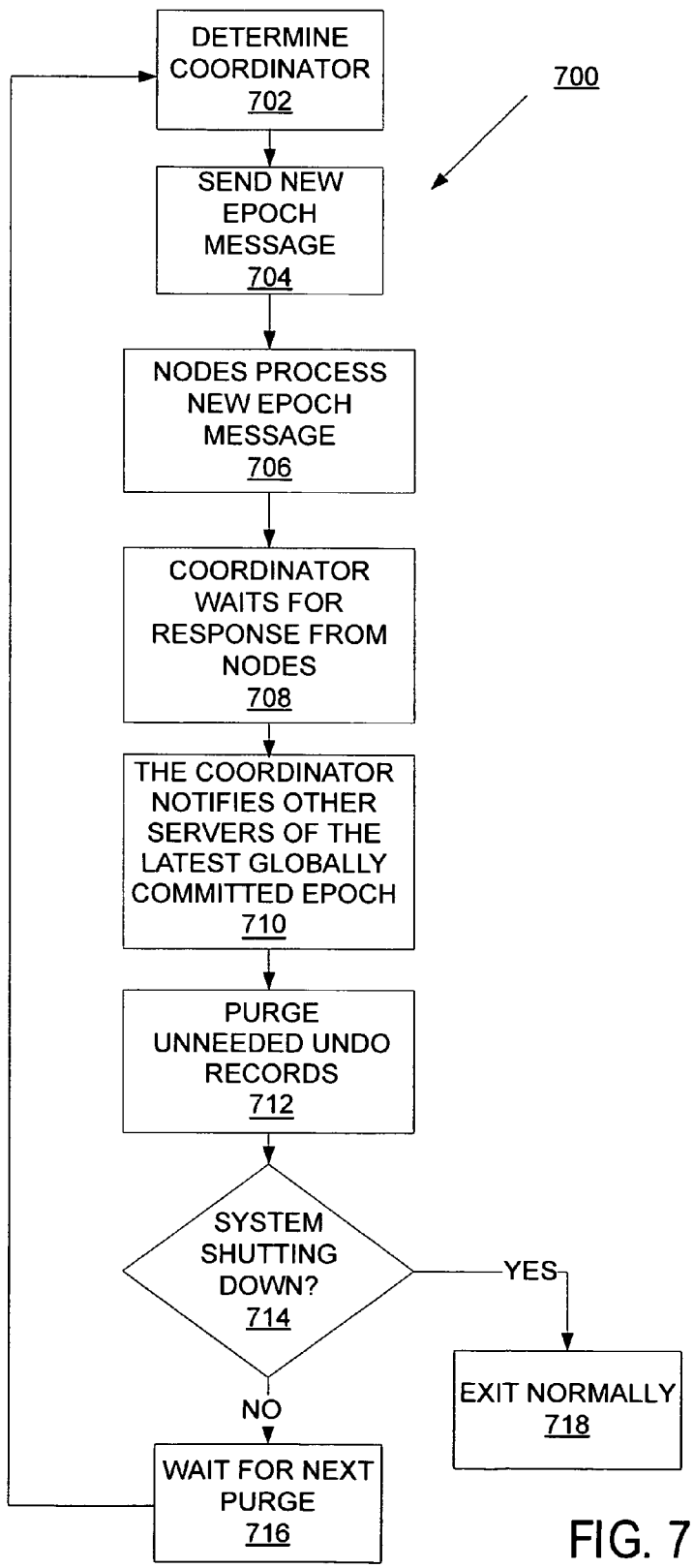
FIG. 7 is a flow diagram of one example of a method that updates epoch undo logs.

FIG. 7 is a flow diagram of one example of a method 700 that updates an epoch. Method 700 initiates a new epoch on each MDS 202A-P and notifies each MDS 202A-P of what records may be purged. In FIG. 7, at block 702, method 700 determines the epoch coordinator. For one example method 700 selects the epoch coordinator in a round robin fashion whose MDS index is equal to the remainder of epoch number divided by the number of MDS nodes 202A-P. Alternate examples may choose epoch coordinator using other ways known in the art (permanent epoch coordinator, selecting based on load, etc.).

At block 704, method 700 sends a control message to MDS 202A-P to move the epoch forward by one. For one example method 700 sends a snapcontrol message with flags SNAPSTATUS_LOCAL|STATUS_NEW_EPOCH. At block 706, MDS 202A-P process the new epoch message. For one example upon receipt of this message, MDS 202A-P move the epoch forward by incrementing the epoch value associated with new undo records. For example and by way of illustration, if MDS 202B is currently storing undo records with epoch value two, after receipt of the snapcontrol message, MDS 202B will create undo records with an epoch value of three. Furthermore, each MDS 202A-P mark the start of a new epoch with a boundary record. The boundary record comprises information that signals the start of a new epoch.

At block 708, method 700 waits for response from MDS 202A-P that the last epoch was committed. For one example coordinator MDS 202A waits for each MDS 202A-P to report back the epoch committed. For one example each MDS 202A-P sends a snapcontrol message with a STATUS_LOCAL flag and the epoch value for the epoch committed to disk.

At block 710 the coordinator notifies each MDS 202A-P of the last globally committed epoch in order to determine which undo records are unneeded. For one example and in response to the reports sent in block 708, method 700 coordinates the reports and reports to MDS 202A-P the latest globally committed epoch. For one example, coordinator MDS 202A determines the last globally committed epoch that each MDS 202A-P committed by determining the greatest globally committed epoch value. Coordinator MDS 202A sends the greatest globally committed epoch value to MDS 202A-P in a snapstatus message with flags STATUS_GLOBAL and STATUS_PURGE. For example and by way of illustration, if MDS 202A has committed epoch four and five, while MDS 202B-P committed epochs five and six, coordinator MDS 202A sends a snapstatus message that epoch five is the most recent globally committed epoch.

At block 712, method 700 purges unneeded undo records. For one example method 700 purges the unneeded undo records in the MDS undo logs. For one example MDS 202A-P purge the undo records in response to the snapstatus message send. Furthermore, method 700 may stop recording undo information for certain transactions. Purging of undo records is further described in FIGS. 8A-B below.

FIG. 8A illustrates one example of undo logs 410A-C for a metadata server cluster when used to purge unneeded undo records. Similar to FIG. 6A, in FIG. 8A MDS undo logs 410A-C each comprise boundary records 418A-C, 426A-C, and 440A-C and undo records as follows: MDS undo log 410A comprises undo records 412A-C with epoch value one, undo record 414A with epoch value two, and undo records 416A-B with epoch value three; MDS undo log 410B comprises undo records 422A-B with epoch value one and undo records 424A-C with epoch value two; while MDS undo log 410C comprises undo records 432A-B with epoch value one, undo record 434A with epoch value two, undo record 436A with epoch value three, and undo records 438A-C with epoch value four. For each undo log, boundary records 418A, 428A, and 440A are associated with epoch one, boundary records 418B, 428B, and 440B are associated with epoch two, and boundary records 418C, 428C, and 440C are associated with epoch three. For this example and by way of illustration, epochs one and two are globally committed to the disk. Thus, because both epochs one and two are globally committed to disk, a rollback of undo records to the end of either epoch produces a fully consistent file system. Thus, it is not necessary to have the undo records prior to the end of epochs one and two. Therefore, method 700 purges the undo records associated with epochs one and two, thus purging undo records 412A-C, 414A, 422A-B, 424A-C, 432A-B, and 434A as well purging the associated boundary records.

FIG. 8B illustrates one example of undo logs for a metadata server cluster used after purging unneeded undo records. As mentioned above, the undo records in epochs 1 and 2 are not needed and method 700 purges those records. In FIG. 8B, method 700 purged the unnecessary records, resulting in MDS undo log 810A with undo records 416A-B and MDS undo log 810C with undo records 436A and 438A-C. Each MDS undo log 810A-C further comprises boundary records 418C, 426C, and 440C, respectively.

Returning back to FIG. 7, at block 714, method 700 determines if the system is shutting down. If not, at block 716, method 700 waits for the next purge. While for one example method 700 waits a pre-determined time before starting the next purge at block 702, for other examples, method 700 waits based on some other metric before starting the next purge at block 702 (based on the number of file transactions, amount of data stored, etc.). Otherwise, at block 718, method 700 concludes the process and exits.

Figure 9:
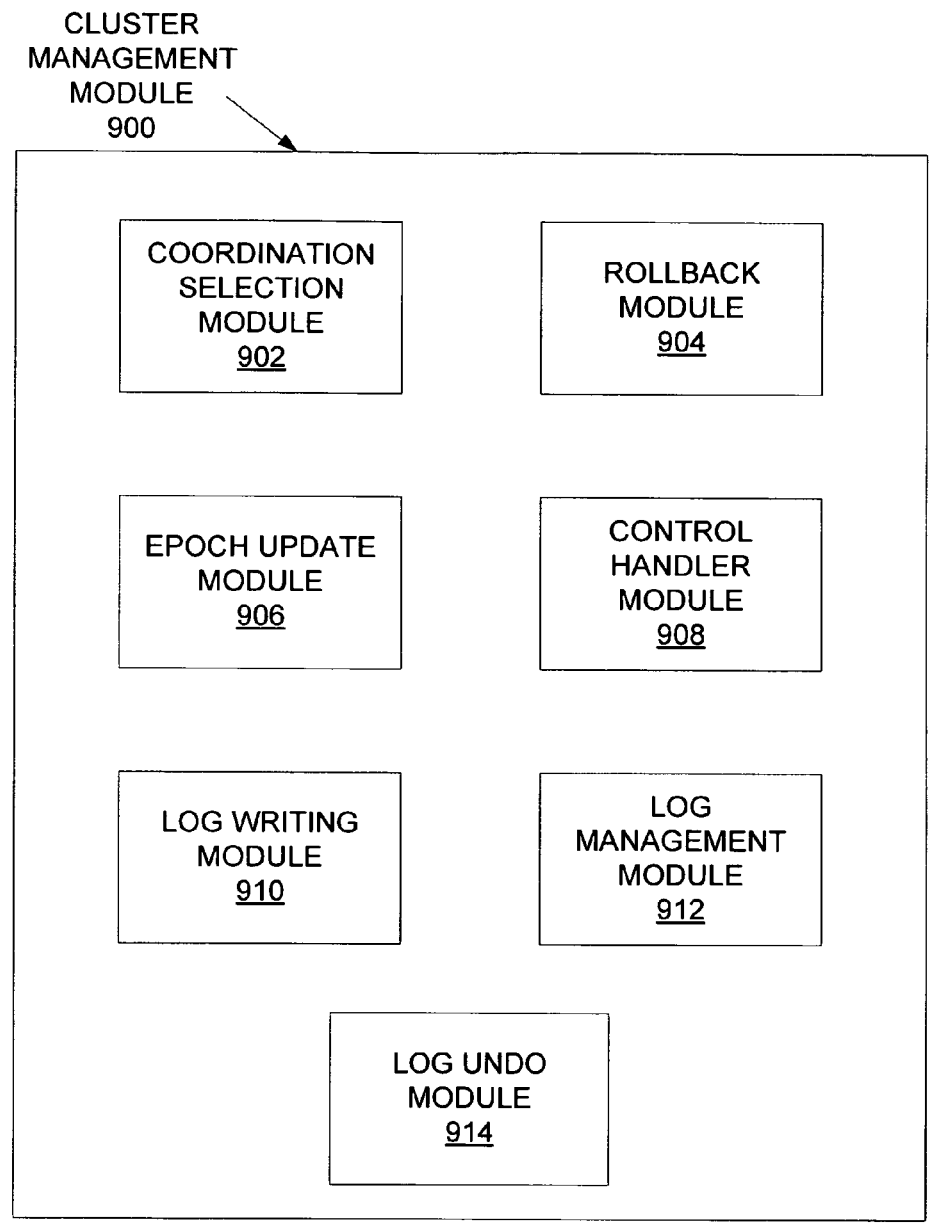
FIG. 9 is a block diagram illustrating one example of metadata cluster management module.

FIG. 9 is a block diagram illustrating one example of cluster management module 900. In FIG. 9, metadata cluster management module 900 comprises coordination selection module 902, rollback module 904, epoch update module 906, control handler module 908, log writing module 910, log management module 912, and log undo module 914. Coordination selection module 902 selects the coordinating MDS for various operations, such as rollback, epoch update, etc. Rollback module 904 manages the rolling back of undo records on the MDS. Furthermore, if the MDS is the coordinator for the rollback, rollback module 904 manages the rollback to the previous epoch as illustrated in FIG. 5, blocks 504-512. Epoch update module 906 manages the updating of epochs as illustrated in FIG. 7. Control handler module 908 manages the passing and receiving of messages used for rollback and epoch update operations. Log writing module 910 controls writing out of the undo logs. Log management module 912 manages the undo logs. Log undo module 914 controls the rolling back of the each undo record in the undo logs.

In practice, the methods described herein may constitute one or more programs made up of machine-executable instructions. Describing the method with reference to the flowchart in FIGS. 5 and 7 enables one skilled in the art to develop such programs, including such instructions to carry out the operations (acts) represented by logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. A variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. Furthermore, more or fewer processes may be incorporated into the methods illustrated in the flow diagrams without departing from the scope of the invention and that no particular order is implied by the arrangement of blocks shown and described herein.

Figure 10:
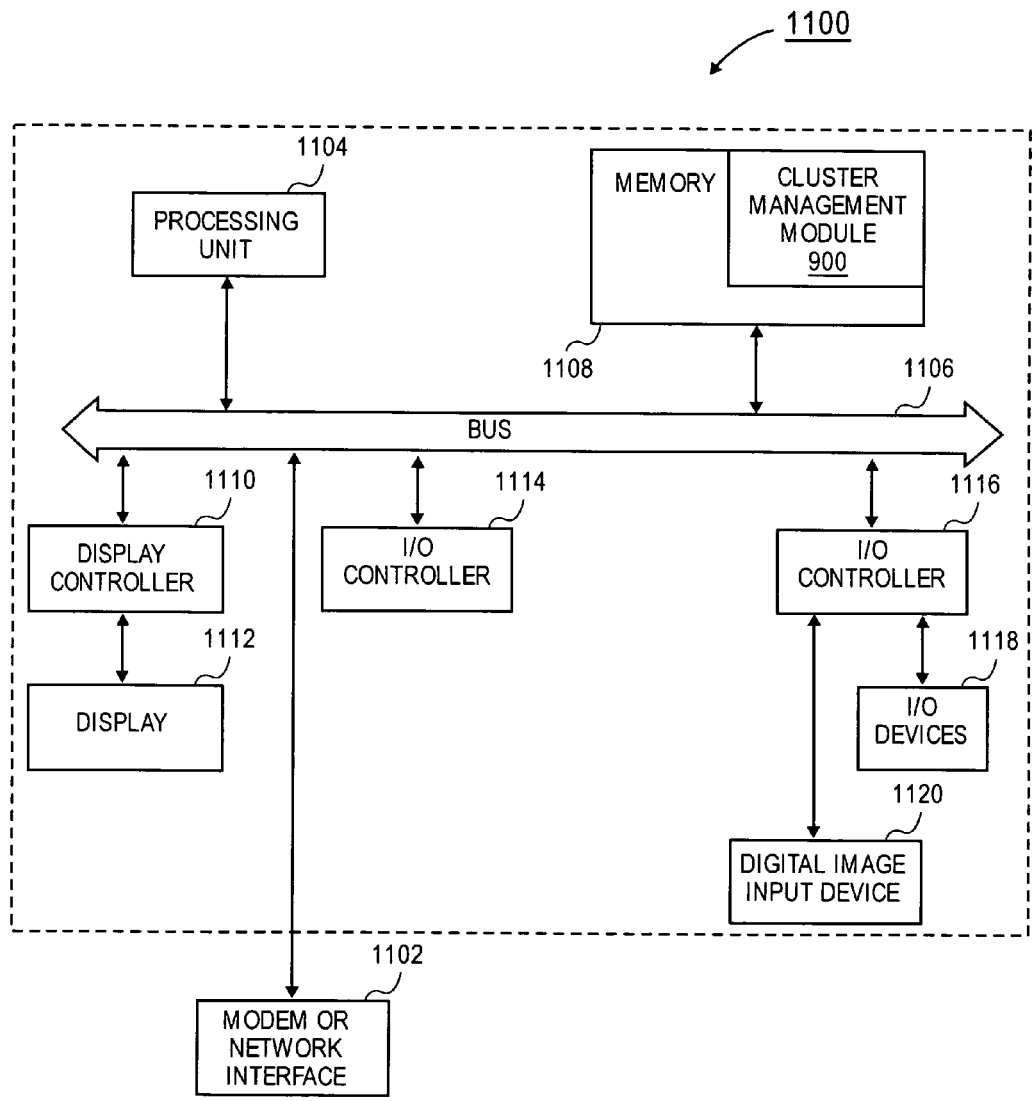
FIG. 10 is a diagram of one example of a computer system suitable for use in the operating environment of FIGS. 5 and 7.

FIG. 10 shows one example of a conventional computer system that can be used. The computer system 1100 interfaces to external systems through the modem or network interface 1102. The modem or network interface 1102 can be considered to be part of the computer system 1100. This interface 1102 can be an analog modem, ISDN modem, cable modem, token ring interface, satellite transmission interface, or other interfaces for coupling a computer system to other computer systems. The computer system 1100 includes a processing unit 1104, which can be a conventional microprocessor such as an Intel® Pentium® or Core Duo™ microprocessor available from Intel Corporation of Santa Clara, Calif. Memory 1108 is coupled to the processor 1104 by a bus 1106. Memory 1108 can be dynamic random access memory (DRAM) and can also include static RAM (SRAM). The bus 1106 couples the processor 1104 to the memory 1108 and also to non-volatile storage 1114 and to display controller 1110 and to the input/output (I/O) controller 1116. The display controller 1110 controls in the conventional manner a display on a display device 1112 which can be a cathode ray tube (CRT) or liquid crystal display (LCD). The input/output devices 1118 can include a keyboard, disk drives, printers, a scanner, and other input and output devices, including a mouse or other pointing device. The display controller 1110 and the I/O controller 1116 can be implemented with conventional well known technology. A digital image input device 1120 can be a digital camera which is coupled to an I/O controller 1116 in order to allow images from the digital camera to be input into the computer system 1100. The non-volatile storage 1114 is often a magnetic hard disk, an optical disk, or another form of storage for large amounts of data. Some of this data is often written by a direct memory access process into memory 1108 during execution of software in the computer system 1100. One of skill in the art will immediately recognize that the terms "computer-readable medium" and "machine-readable medium" include any type of storage device that is accessible by the processor 1104 and also encompass a carrier wave that encodes a data signal.

Network computers are another type of computer system that can be used with the embodiments of the present invention. Network computers do not usually include a hard disk or other mass storage, and the executable programs are loaded from a network connection into the memory 1108 for execution by the processor 1104. A Web TV system, which is known in the art, is also considered to be a computer system according to the embodiments of the present invention, but it may lack some of the features shown in FIG. 11, such as certain input or output devices. A typical computer system will usually include at least a processor, memory, and a bus coupling the memory to the processor.

For one embodiment, memory 1108 comprises cluster management module 900 as described in FIG. 9 above.

The computer system 1100 is one example of many possible computer systems, which have different architectures. For example, personal computers based on an Intel® microprocessor often have multiple buses, one of which can be an input/output (I/O) bus for the peripherals and one that directly connects the processor 1104 and the memory 1108 (often referred to as a memory bus). The buses are connected together through bridge components that perform any necessary translation due to differing bus protocols.

The computer system 1100 is controlled by operating system software, which includes a file management system, such as a disk operating system, which is part of the operating system software. One example of an operating system software with its associated file management system software is the family of operating systems known as Windows® available from Microsoft Corporation of Redmond, Wash., and their associated file management systems. The file management system is typically stored in the non-volatile storage 1114 and causes the processor 1104 to execute the various acts required by the operating system to input and output data and to store data in memory, including storing files on the non-volatile storage 1114.

In the foregoing specification, the invention has been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A computerized method for recovering a file system in a distributed file system, the method comprising:
    defining a plurality of undo records;
    defining epoch level boundaries among the plurality of undo records, wherein each epoch level boundary is associated with a corresponding epoch level that describes a fully consistent file system across a plurality of metadata servers, wherein the plurality of undo records represent information associated with file transactions initiated by the plurality of metadata servers;
    receiving a rollback request;
    determining a rollback epoch level; and
    rolling back to the rollback epoch level by executing all undo records subsequent to the rollback epoch level boundary, wherein the resulting file system is a fully consistent file system across the plurality of metadata servers.

2. The computerized method of claim 1, wherein the plurality of undo records have multiple dependencies.

3. The computerized method of claim 1, wherein the rolling back occurs in response to at least two metadata servers from the plurality of metadata servers losing file transactions.

4. The computerized method of claim 1, wherein determining a rollback epoch level further comprises:
    requesting an epoch level status from the plurality of metadata servers;
    determining a common epoch level across the epoch level status from the plurality of metadata servers; and
    setting the rollback epoch level as the determined common epoch level.

5. The computerized method of claim 1, further comprising:
    sending a control message to the plurality of metadata servers to advance the epoch level.

6. The computerized method of claim 1, further comprising:
    reporting a committed epoch level to the plurality of metadata servers; and
    purging at the plurality of metadata servers undo records previous to the boundary of the committed epoch level.

7. The computerized method of claim 1, further comprising storing a plurality of undo records associated with one metadata server from the plurality of metadata servers in an undo log.

8. The computerized method of claim 1, further comprising recovering the file system on one metadata server from the plurality of metadata servers using a redo log associated with the one metadata server.

9. A tangible machine readable medium having executable instructions to cause a processor to perform a method comprising:
    defining a plurality of undo records;
    defining epoch level boundaries among the plurality of undo records, wherein each epoch level boundary is associated with a corresponding epoch level that describes a fully consistent file system across a plurality of metadata servers, wherein the plurality of undo records represent information associated with file transactions initiated by the plurality of metadata servers;
    receiving a rollback request;
    determining a rollback epoch level; and
    rolling back to the rollback epoch level by executing all undo records subsequent to the rollback epoch level boundary, wherein the resulting file system is a fully consistent file system across the plurality of metadata servers.

10. The machine readable medium of claim 9, wherein the plurality of undo records have multiple dependencies.

11. The machine readable medium of claim 9, wherein the rolling back occurs in response of at least two metadata servers from the plurality of metadata servers losing file transactions.

12. The machine readable medium of claim 9, wherein determining a rollback epoch level further comprises:
    requesting an epoch level status from the plurality of metadata servers;
    determining a common epoch level across the epoch level status from the plurality of metadata servers; and
    setting the rollback epoch level as the determined common epoch level.

13. The machine readable medium of claim 9, further comprising:
    sending a control message to the plurality of metadata servers to advance the epoch level.

14. The machine readable medium of claim 9, further comprising:
    reporting a committed epoch level to the plurality of metadata servers; and
    purging at the plurality of metadata servers undo records previous to the boundary of the committed epoch level.

15. The machine readable medium of claim 9, further comprising storing a plurality of undo records associated with one metadata server from the plurality of metadata servers in an undo log.

16. The machine readable medium of claim 9, further comprising recovering the file system on one metadata server from the plurality of metadata servers using a redo log associated with the one metadata server.

17. A system comprising:
    a plurality of metadata servers;
    a processor;
    a memory coupled to the processor though a bus; and
    a process executed from the memory by the processor to cause the processor to:
        define a plurality of undo records,
        define epoch level boundaries among the plurality of undo records, wherein each epoch level boundary is associated with a corresponding epoch level that describes a fully consistent file system across the plurality of metadata servers, wherein the plurality of undo records represent information associated with file transactions initiated by the plurality of metadata servers, receive a rollback request, determine a rollback epoch level, and roll back to the rollback epoch level by executing all undo records subsequent to the rollback epoch level boundary, wherein the resulting file system is a fully consistent file system across the plurality of metadata servers.

18. The system of claim 17, wherein the plurality of undo records have multiple dependencies.

19. The system of claim 17, wherein the the roll back occurs in response of at least two metadata servers from the plurality of metadata servers losing file transactions.

20. The system of claim 17, wherein to determine a rollback epoch level the process further causes the processor to, request an epoch level status from the plurality of metadata servers, determine a common epoch level across the epoch level status from the plurality of metadata servers, and set the rollback epoch level as the determined common epoch level.

21. The system of claim 17, wherein the process further causes the processor to send a control message to the plurality of metadata servers to advance the epoch level.

22. The system of claim 17, wherein the process further causes the processor to report a committed epoch level to the plurality of metadata servers and to purge at the plurality of metadata servers undo records previous to the boundary of the committed epoch level.

23. The system of claim 17, wherein the process further causes the processor to store a plurality of undo records associated with one metadata server from the plurality of metadata servers in an undo log.

24. The system of claim 17, wherein the process further causes the processor to recover the file system on one metadata server from the plurality of metadata servers using a redo log associated with the one metadata server.

* * * * *